(12) United States Patent
Shih

(10) Patent No.: US 6,547,053 B2
(45) Date of Patent: Apr. 15, 2003

(54) TORSIONAL VIBRATION DAMPER

(75) Inventor: Shan Shih, Troy, MI (US)

(73) Assignee: ZF Meritor, LLC, Laurinburg, NC (US)

( * ) Notice: Subject to any disclaimer, the term of this patent is extended or adjusted under 35 U.S.C. 154(b) by 0 days.

(21) Appl. No.: 09/822,892

(22) Filed: Mar. 30, 2001

(65) Prior Publication Data

US 2002/0139630 A1 Oct. 3, 2002

(51) Int. Cl.[7] .............. F16D 11/14; F16D 3/10
(52) U.S. Cl. .......... 192/55.61; 74/574; 192/212; 192/69.9; 464/82; 188/378; 267/136
(58) Field of Search ............ 192/55.61, 212–214.1, 192/70.17, 69.9, 30 V; 74/574, 572, 573 R; 464/67, 68, 62, 64, 63, 82, 58, 88, 66, 180; 188/378; 267/136; 475/207, 208, 269

(56) References Cited

U.S. PATENT DOCUMENTS

| 4,703,840 | A | 11/1987 | Bopp |
| 4,777,843 | A | 10/1988 | Bopp |
| 4,782,936 | A | 11/1988 | Bopp |
| 4,790,792 | A | 12/1988 | Bopp |
| 4,874,074 | A | 10/1989 | Damon et al. |
| 4,989,713 | A | 2/1991 | Janson |
| 5,078,648 | A | 1/1992 | Stretch |
| 5,185,543 | A | * 2/1993 | Tebbe .............. 74/574 |
| 5,246,399 | A | 9/1993 | Yanko et al. |
| 5,715,922 | A | 2/1998 | Imanaka |
| 6,217,475 | B1 | * 4/2001 | Shih |

* cited by examiner

Primary Examiner—Douglas C. Butler
(74) Attorney, Agent, or Firm—Carlson, Gaskey & Olds

(57) ABSTRACT

A torsional vibration damper is used for reducing or eliminating torsional vibrations in a vehicle driveline. A hub portion includes an elongated body with a first axial dimension. A disk portion is supported by the hub portion and has a second axial dimension that is smaller than the first axial dimension of the hub portion. The hub portion preferably is secured to rotate with an engine flywheel and the disk portion preferably is adapted to rotate with a transmission input shaft. The disk portion preferably supports a plurality of damping members, which can be positioned at different radial or axial locations depending on the needs of a particular situation.

13 Claims, 1 Drawing Sheet

TORSIONAL VIBRATION DAMPER

BACKGROUND OF THE INVENTION

This invention generally relates to a torsional vibration damper for use in a vehicle driveline.

Vehicle drivelines typically include an engine or power source, a clutch, a transmission, a drive shaft and axles to drive the wheels of the vehicle. One problem that has always been difficult to solve is to eliminate or at least reduce torsional vibrations along the driveline components. Several attempts have been made to solve this problem, however, most have proven of limited value. Moreover, typical design restraints on a vehicle driveline have prevented more than just a few basic designs to be utilized.

One typical attempt at providing torsional vibration control is to include a torsional damper disk in the clutch. Such damper disks typically include a plate with springs and friction washers to provide torsional damping. The dampers within the clutch are typically sandwiched between the clutch plates. Therefore, very tight size constraints have been placed on such torsional dampers because the space within a clutch housing is very limited.

An additional drawback associated with current torsional damper arrangements is that they complicate the design of the clutch and the vehicle driveline. With conventional arrangements, it is not possible to incorporate the clutch into the transmission. Separate components and separate housings for the clutch and transmission are required with conventional designs. This situation increases driveline costs and space requirements.

Another attempt has been to include a torsional vibration damper within a dual mass flywheel arrangement. This typically also included a single disk with embedded coiled springs sandwiched between portions of the flywheel. Again, because typical flywheel arrangements have limited space, the design constraints on such torsional dampers has left them with size and durability limitations.

Those skilled in the art have long been seeking a torsional vibration damper design that will effectively eliminate or at least greatly reduce vibrations along the driveline. This invention provides a unique solution to that problem and avoids the shortcomings and drawbacks of previous designs.

SUMMARY OF THE INVENTION

In general terms, this invention is a torsional vibration damper for use in a vehicle driveline. A damper designed according to this invention is not necessarily incorporated into any other components or housings in the driveline; it is an independent component that can be positioned anywhere along the driveline. The inventive damper includes a hub portion that is adapted to rotate with other driveline components. The hub portion supports a disk element that is adapted to rotate with a driveline component. Damping elements such as springs interact with the hub and the disk to dampen torsional vibrations in the vehicle driveline. In one example, friction washers are included between the hub and disk.

A driveline designed according to this invention includes a torsional vibration damper outside of a clutch housing. Another feature of the inventive driveline is having the clutch incorporated into the transmission and housed within the transmission housing.

The inventive design provides the ability to include as many disks or damping elements as needed for a given situation. Moreover, the design of a torsional damper according to this invention eliminates the space and size constraints that have previously prevented effective vibration reduction.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
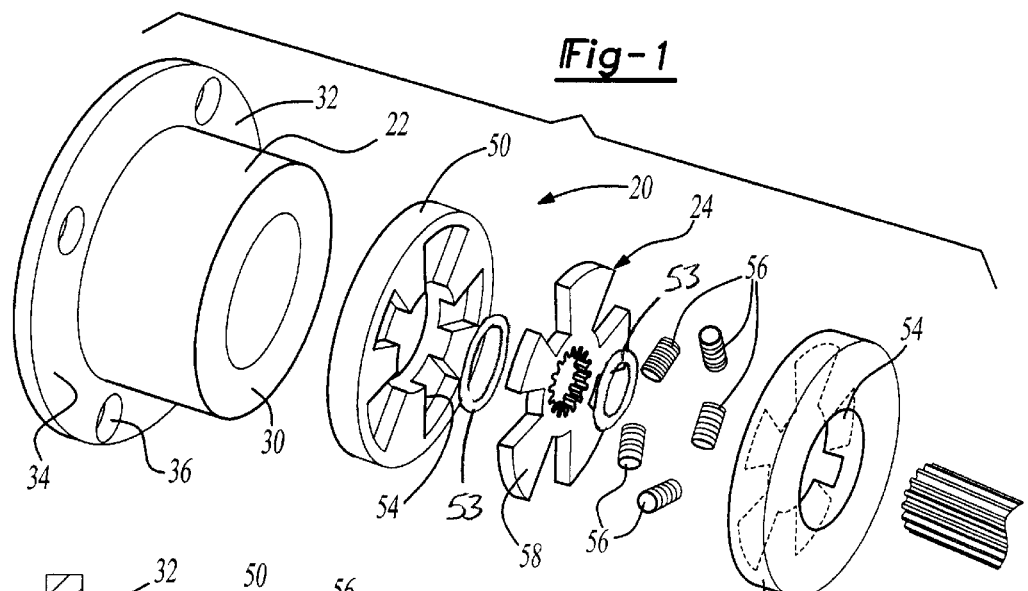
FIG. 1 diagrammatically illustrates in exploded perspective view a torsional vibration damper designed to according to this invention.
Figure 2:
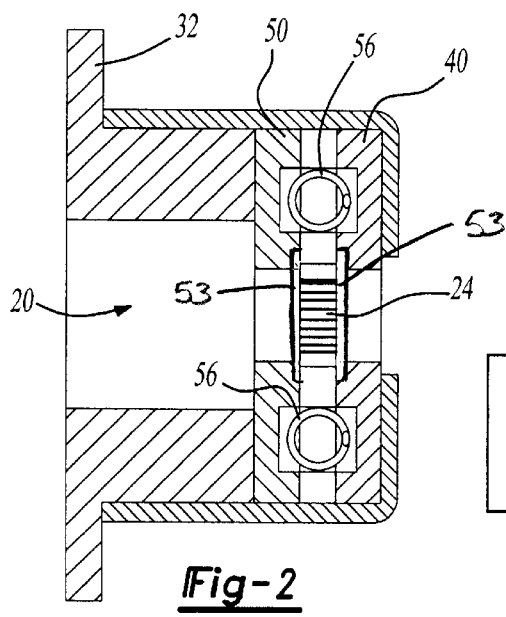
FIG. 2 is a side cross-sectional view of the torsional damper illustrated in FIG. 1.

FIGS. 1 and 2 illustrate a torsional vibration damper 20 that includes a hub portion 22 and a disk portion 24. The hub portion 22 includes an elongated body 30 with a flange 32 at one axial end. The flange 32 is adapted to be secured to an engine flywheel 34. In the illustrated embodiment, connectors 36 such as bolts are used to secure the flange 32 to the flywheel 34. Other methods of securing the flange 32 to a flywheel 34 can be utilized depending on the needs of a particular situation.

Figure 4:
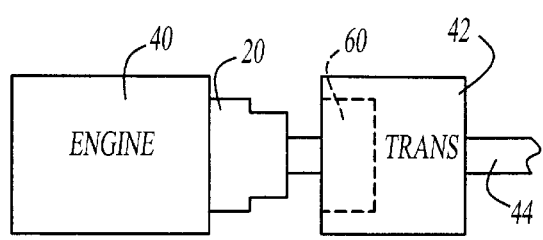
FIG. 4 illustrates another example embodiment of a driveline designed according to this invention.

Although FIG. 1 illustrates the damper flange 32 associated with an engine flywheel 34, that type of arrangement is not required. A significant advantage presented by this invention is that the torsional damper can be located anywhere along the vehicle driveline. For example, FIG. 4 illustrates a driveline designed according to this invention that includes the torsional damper 20 positioned between an engine 40 and a transmission 42.

Figure 3:
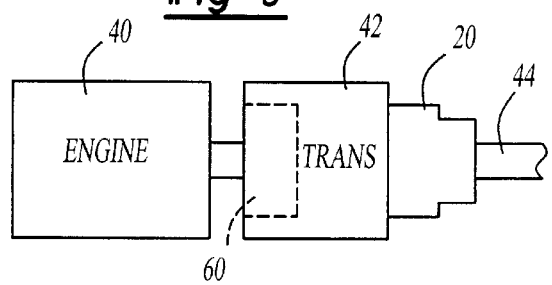
FIG. 3 illustrates a vehicle driveline designed according to this invention.

Another example is shown in FIG. 3 where the torsional damper 20 is on the opposite side of transmission 42 from the engine 40 (i.e., at the end of the transmission housing with a transmission output shaft 42 is positioned). The inventive torsional damper 20 is a stand-alone device in that it is capable of being positioned anywhere along the vehicle driveline and need not be placed within a housing such as a clutch housing.

Two plate portions 50 and 52 preferably are disposed on opposite sides of the disk portion 24. The plate portions 50 and 52 preferably are secured to the hub portion 22 such that there is no relative movement between them as the driveline components rotate. As an option, friction washers 53 can be incorporated in between plate 50 and disc 24 as well as plate 52 and disc 24 such that friction damping is produced whenever there is relative angular motion between disc 24 and the plates 50 and 52.

Each of the plate portions 50 and 52 include cutaway portions 54 that receive damping elements 56, which are coil springs in the illustrated example. The dampening elements 56 engage the surfaces of the cutaway portions 54 on the plate portions. The dampening elements 56 also engage spoke portions 58 on the disk portion 24. As can be appreciated from the drawings, the dampening elements are sandwiched or nested between the spoke portions 58 and the cutaway portions 54.

The dampening elements 56 and the optional friction washers 53 provide torsional vibration dampening in a manner that is understood by those skilled in the art. With the inventive arrangement, however, greater flexibility and versatility is possible. Because the dampening elements 56 are not constrained within a clutch housing, for example, various sizes and axial positioning of the dampening elements 56 are possible with a vibration damper designed according to this invention.

As can be appreciated from the drawings, the hub portion 22 has a first axial dimension that is greater than the axial dimension of the disk portion 24. The elongated body portion 30 of the hub 22 provides significant advantages in designing a torsional damper to accommodate the torsional vibrations in a variety of vehicle drivelines. Prior to this invention, size constraints on torsional vibration dampers have rendered them less than effective. With the inventive arrangement, however, a variety of configurations are possible because the size constraint limitations are no longer a problem. Having the hub portion 22 with an axial dimension that is greater than the axial dimension (i.e., thickness) of the disk portion 24 provides a much larger torsional vibration damper 20 than was previously utilized or attempted. Previous designs typically only had a single axial dimension such as the thickness of the disk portion 24. The larger hub dimension of this invention provides a larger moment of inertia. Moreover, the moment of inertia can be chosen by selecting the dimensions and characteristics of the hub portion.

With the inventive arrangement, a variety of configurations are possible that could not be achieved with conventional arrangements. Damping elements such as the springs 56 can be positioned at different radial locations with respect to the axis of the disk portion 24. Providing damping members at different radial locations can achieve better torsional vibration damping in different circumstances. Additionally, the elimination of space constraints permits the use of multiple sets of dampers at multiple axial locations. In other words, multiple disks members each with its own set of damper elements are possible with this invention.

Those skilled in the art who have the benefit of this description will be able to determine what configuration and arrangement of components will best work for their particular situation.

As schematically illustrated in FIGS. 3 and 4, vehicle driveline designed according to this invention includes the torsional damper 20 positioned outside of the housings for the transmission or clutch. Significantly, the torsional damper of this invention permits a design of a vehicle driveline such that the clutch 60 is integrated as part of the transmission 42. With this invention, a separate clutch housing is no longer required. Incorporating the clutch into the transmission provides significant advantages from a cost savings viewpoint as well as space savings, which is always a concern in modern vehicle design.

Example implementations of this invention are given in the description above. This invention, however, is not limited to the details of those examples. Variations and modifications may become apparent to those skilled in the art that do not depart from the spirit or basis of this invention. The scope of legal protection given to this invention can only be determined by studying the following claims.

I claim:

1. A vehicle driveline assembly, comprising:
    an engine output member;
    a transmission gearbox having a housing and a plurality of selectively engageable gear members;
    a clutch that selectively couples the engine output member to the gear members within the gearbox housing; and
    a torsional damper including a hub portion adapted to rotate with a first selected member of the driveline assembly, a disk portion that is adapted to rotate with a second selected member of the driveline assembly and a plurality of damping members associated with the hub portion and the disk portion, the torsional damper being supported in the driveline outside of the gearbox housing, the torsional damper including two plate portions disposed in opposite sides of the disk portion, the plate portions being secured to the hub portion such that there is no relative movement between the plate portions and the hub portion, each plate portion including cutaway portions that receive the damping elements, the disk portion including spokes that have surfaces that engage the damping elements.

2. The assembly of claim 1, wherein the hub portion includes a flange that is adapted to secured to the first selected member of the assembly.

3. The assembly of claim 1, wherein the damping members comprise springs and friction washers.

4. The assembly of claim 1, wherein the damper is positioned between the transmission gearbox and the engine output member.

5. The assembly of claim 1, wherein the damper is positioned between an output of the transmission gearbox and wheel components.

6. The assembly of claim 1, wherein the clutch is housed within the gearbox housing.

7. The assembly of claim 1, wherein the damping elements include coil springs that are received between corresponding surfaces on the spokes and the cutaway portions.

8. The assembly of claim 1, wherein the hub portion has an axial dimension that is greater than an axial dimension of the disk portion.

9. A vehicle driveline assembly, comprising;
    a transmission gearbox having a housing and a plurality of selectively engageable gear members;
    a clutch portion within the gearbox housing; and
    a torsional damper including a hub portion adapted to rotate with a first selected member of the driveline assembly, a disk portion that is adapted to rotate with a second selected member of the driveline assembly and a plurality of damping members associated with the hub portion and the disk portion, the torsional damper being supported in the driveline outside of the gearbox housing, the torsional damper including two plate portions disposed on opposite sides of the disk portion, the plate portions being secured to the hub portion such that there is no relative movement between the plate portions and the hub portions, each plate portion including cutaway portions that receive the damping elements, the disk portion including spokes that have surfaces that engage the damping elements.

10. The assembly of claim 9, including an engine output member and wherein the damper is positioned between the transmission gearbox and the engine output member.

11. The assembly of claim 9, wherein the damper is positioned between an output of the transmission gearbox and wheel components.

12. The assembly of claim 9, wherein the damping elements include coil springs that are received between corresponding surfaces on the spokes and the cutaway portions.

13. The assembly of claim 9, wherein the hub portion has an axial dimension that is greater than an axial dimension of the disk portion.

* * * * *